(12) United States Patent
Jackson et al.

(10) Patent No.: US 10,697,142 B1
(45) Date of Patent: Jun. 30, 2020

(54) WASTE CATCHING DEVICE

(71) Applicants: Jermaine Antonio Jackson, Los Angeles, CA (US); Erik Ortiz, Mission Hills, CA (US)

(72) Inventors: Jermaine Antonio Jackson, Los Angeles, CA (US); Erik Ortiz, Mission Hills, CA (US)

( * ) Notice: Subject to any disclaimer, the term of this patent is extended or adjusted under 35 U.S.C. 154(b) by 0 days.

(21) Appl. No.: 16/538,951

(22) Filed: Aug. 13, 2019

(51) Int. Cl.
*A01K 29/00* (2006.01)
*E01H 1/12* (2006.01)
*A01K 23/00* (2006.01)

(52) U.S. Cl.
CPC .......... *E01H 1/1206* (2013.01); *A01K 23/005* (2013.01); *E01H 2001/1293* (2013.01)

(58) Field of Classification Search
CPC ............................ E01H 1/1206; A01K 23/005
USPC ................ 294/1.3, 1.4, 1.5, 176, 50, 51, 52; 119/161; 383/40, 41, 127
See application file for complete search history.

(56) References Cited

U.S. PATENT DOCUMENTS

| | | | | |
|---|---|---|---|---|
| 3,194,597 A * | 7/1965 | Lasch, Jr. | ................... | B25J 1/04 294/115 |
| 3,977,422 A | 8/1976 | Cabaluna | | |
| 4,097,082 A * | 6/1978 | Orofino | ................. | E01H 1/1206 294/1.4 |
| 4,248,468 A * | 2/1981 | Hastings | ............... | E01H 1/1206 294/1.4 |
| 5,503,442 A * | 4/1996 | Lee | ......... | E01H 1/1206 294/1.4 |
| 6,386,606 B1 | 5/2002 | Marshall | | |
| 7,686,361 B1 * | 3/2010 | Flinn | ..................... | E01H 1/1206 294/1.4 |
| 7,992,907 B1 * | 8/2011 | DeJesus | ................. | E01H 1/1206 294/1.4 |
| 8,177,270 B2 | 5/2012 | Chen | | |
| 8,544,907 B2 | 10/2013 | Powell | | |
| 8,550,512 B2 * | 10/2013 | Jones, Jr. | ............. | A01K 23/005 294/1.5 |
| D802,229 S * | 11/2017 | Rouayroux | ................... | D30/162 |
| 10,370,810 B1 * | 8/2019 | Times | ................... | E01H 1/1206 |
| 2008/0012366 A1 * | 1/2008 | Tsukamoto | ........... | A01K 23/005 294/1.5 |
| 2008/0136201 A1 * | 6/2008 | Dong | .................... | E01H 1/1206 294/1.3 |
| 2008/0265592 A1 * | 10/2008 | Askinasi | ............... | E01H 1/1206 294/1.4 |
| 2009/0096227 A1 * | 4/2009 | Pender | ................. | A01K 23/005 294/1.5 |

* cited by examiner

*Primary Examiner* — Paul T Chin
(74) *Attorney, Agent, or Firm* — Dunlap Bennett & Ludwig PLLC

(57) ABSTRACT

A waste catching device includes an elongated rod having a first end and a second end. A handle is coupled to the first end the elongated rod. The handle includes a lever. A head is coupled to the second end of the elongated rod 18. The head includes a claw having a first pivoting arm and a second pivoting arm. A spring biases distal ends of the first pivoting arm and the second pivoting arm together. Bands couple the lever to proximal ends of the first pivoting arm and the second pivoting arm. The claw includes an open position and a closed position. The open position includes the lever actuated to pull the first pivoting arm and the second pivoting arm away from one another, and a closed position includes the lever released.

8 Claims, 4 Drawing Sheets

WASTE CATCHING DEVICE

BACKGROUND OF THE INVENTION

The present invention relates to feces removal and, more particularly, to a waste catching device for pets.

During dog walks, one must squat down and collect their pet's feces using either a bag or old newspaper. For those that have knee and back issues, this process can be painful. Additionally, it is currently difficult to collect and dispose of the animal feces in a clean manner without coming in contact with the feces.

Current devices used to collect feces allow the feces to hit the ground. This forces the user to bend over to pick it up and leaves residual feces on the ground. Other devices require a user to touch the bag to remove the bag from the device once feces are in it, which allows for the possibility of touching feces with bare hands.

As can be seen, there is a need for an improved waste catching device for pets.

SUMMARY OF THE INVENTION

In one aspect of the present invention, a waste catching device comprises: an elongated rod comprising a first end and a second end; a handle coupled to the first end of the elongated rod, the handle comprising a lever; a head coupled to the second end, wherein the head comprises: a claw comprising a first pivoting arm and a second pivoting arm; and a spring biasing distal ends of the first pivoting arm and the second pivoting arm together; and bands coupling the lever to proximal ends of the first pivoting arm and the second pivoting arm, wherein the claw comprises an open position and a closed position, wherein the open position comprises the lever actuated to pull the first pivoting arm and the second pivoting arm away from one another, and a closed position comprises the lever released.

In another aspect of the present invention, a method of catching waste comprise steps of: providing a waste catching device comprising: an elongated rod comprising a first end and a second end; a handle coupled to the first end of the elongated rod, the handle comprising a lever; a head coupled to the second end, wherein the head comprises: a claw comprising a first pivoting arm and a second pivoting arm; and a spring biasing distal ends of the first pivoting arm and the second pivoting arm together; and bands coupling the lever to proximal ends of the first pivoting arm and the second pivoting arm; attaching an opening of a bag to the claw; pressing against the lever, thereby urging the first pivoting arm and the second pivoting arm away from one another so that the bag opens; placing the bag underneath an anus of a defecating animal; and releasing the lever after feces has dropped in the bag, thereby closing the bag.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes a waste catching device so that one does not have to bend over and pick up the feces. The present invention further prevents people from accidentally touching feces. A disposable bag is placed on the head of the device with corresponding claws. The device is carried about until ready to be used. When the dog is dropping the waste the lever is pulled, opening the claws. The head of the device is held behind the dog to collect the waste. Once the dog is done the lever is released, closing the claws. The waste never hits the ground, so no cleanup is necessary. The waste is kept in the bag so one never comes in contact with the waste or have to clean up any waste. Once the waste is ready to be dispose a support is released dropping the entire bag to be discarded. A new bag can then be loaded ready to be used again. The device never comes in direct contact with the waste and the waste never hits the ground.

Figure 1:
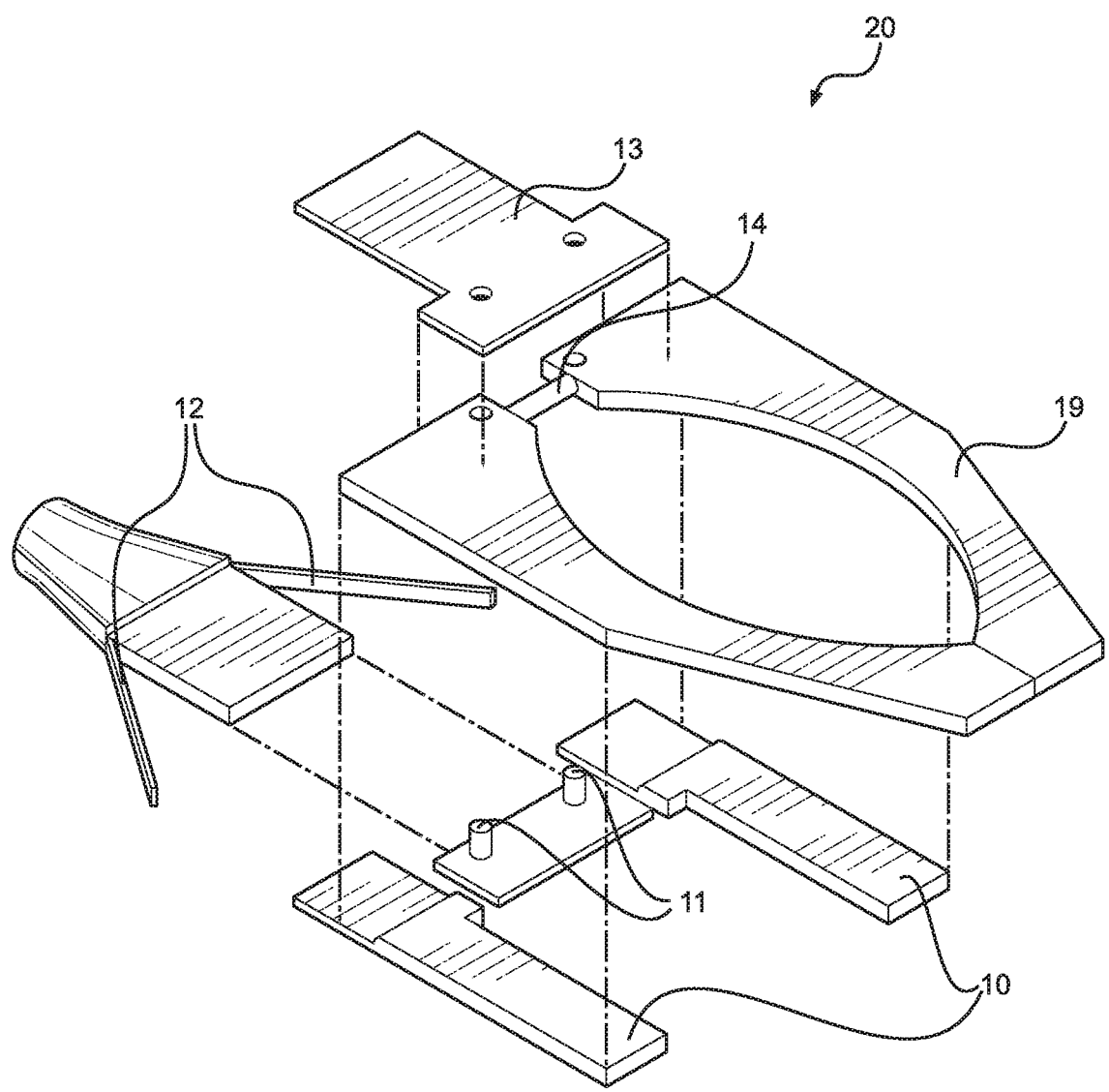
FIG. 1 is an exploded view of an embodiment of the present invention.
Figure 2:
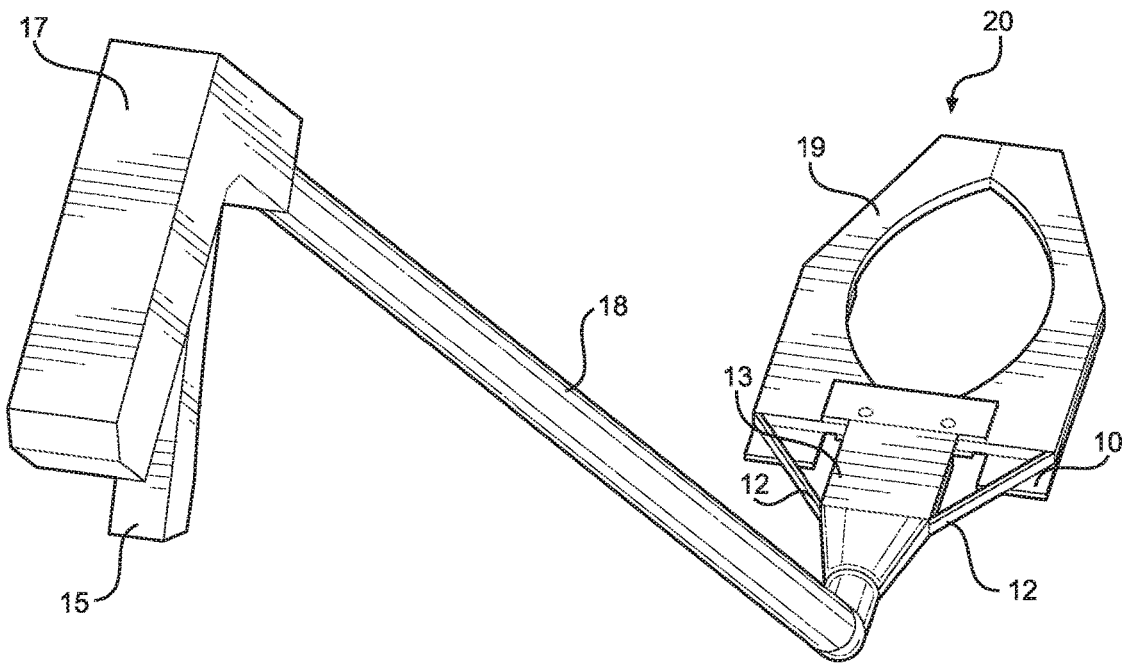
FIG. 2 is a rear perspective view of an embodiment of the present invention.
Figure 3:
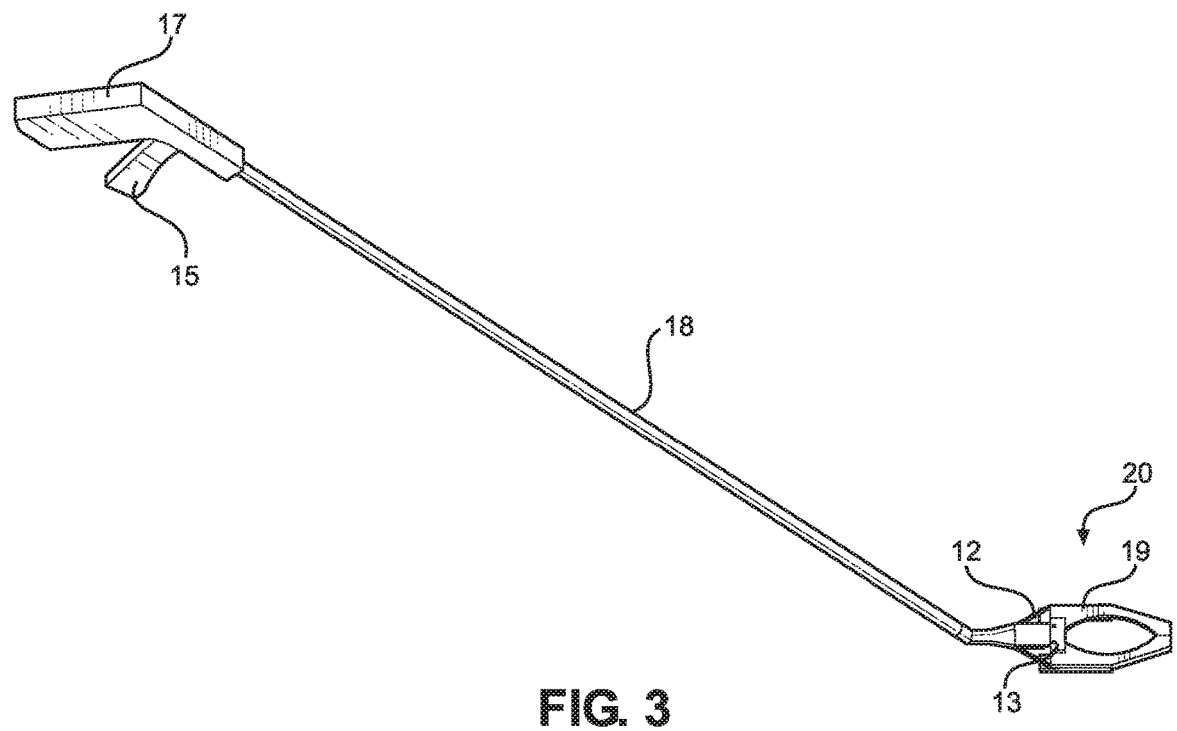
FIG. 3 is a side perspective view of an embodiment of the present invention.
Figure 4:
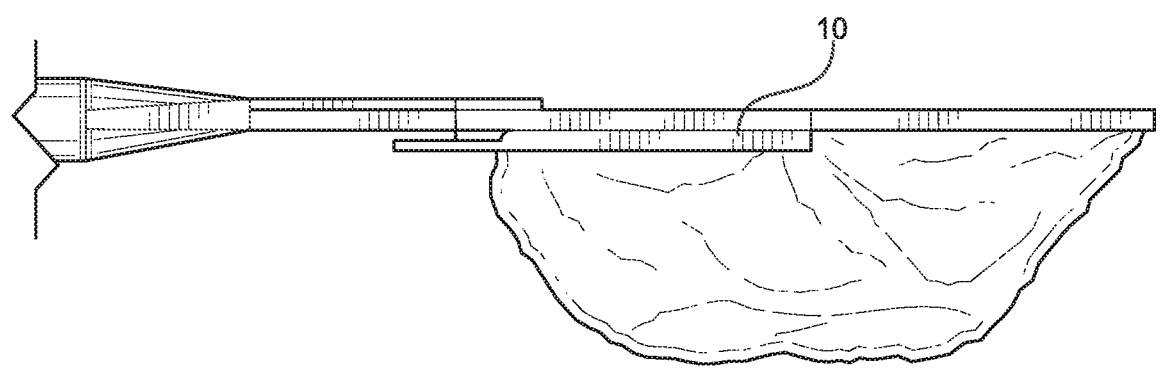
FIG. 4 is a section side view of an embodiment of the present invention.
Figure 5:
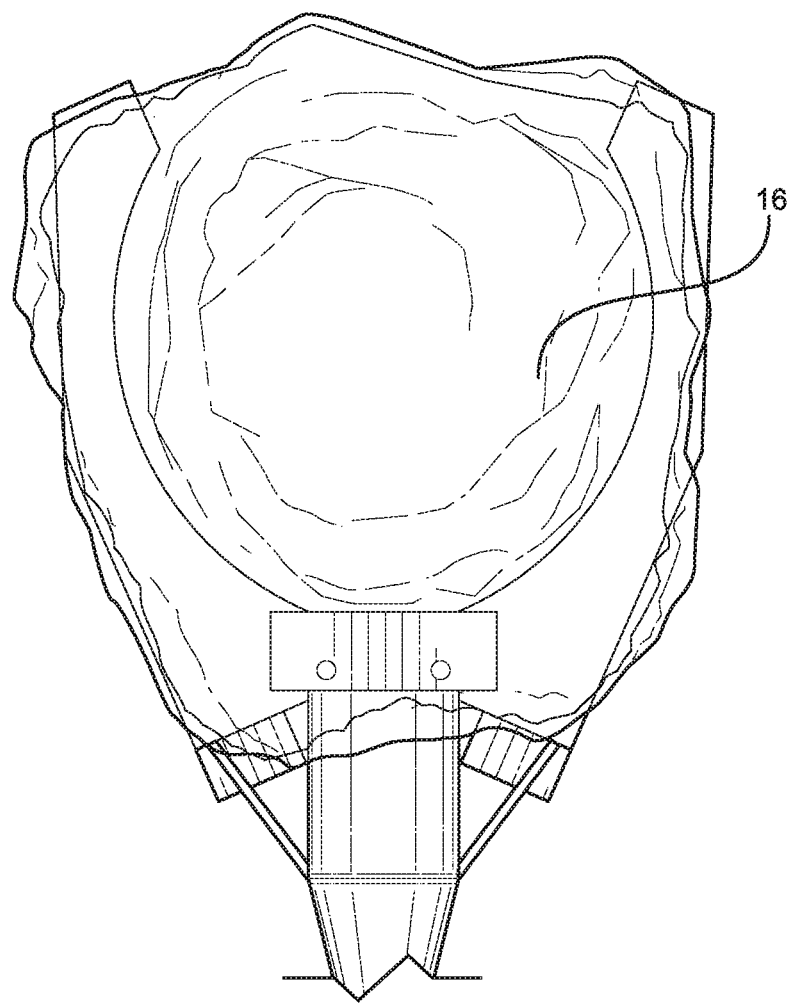
FIG. 5 is a section top view of an embodiment of the present invention.
Figure 6:
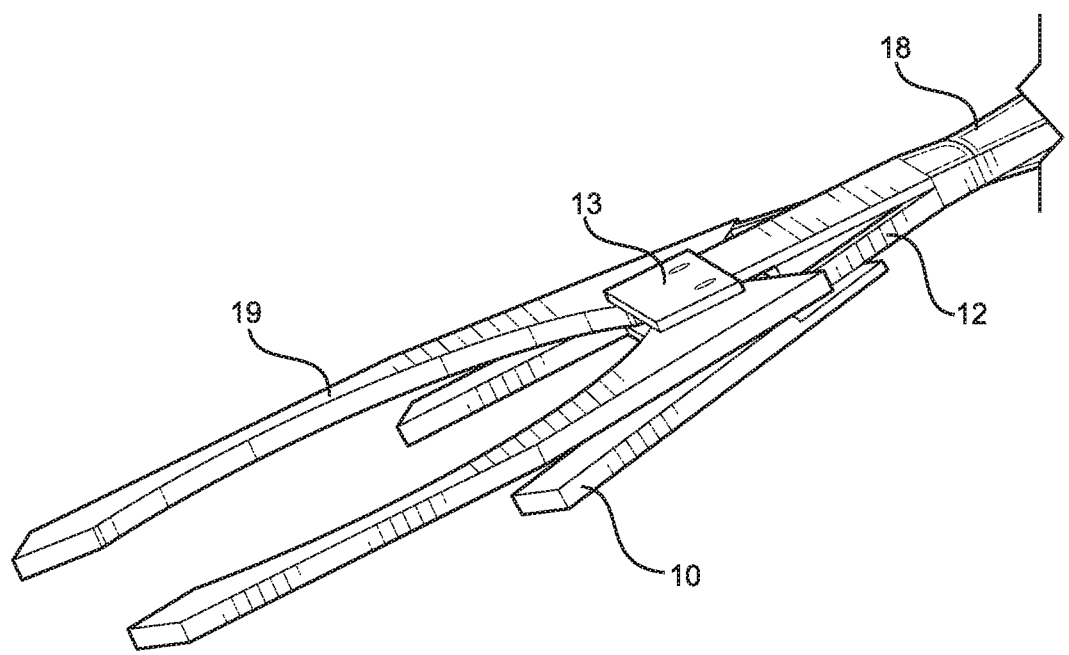
FIG. 6 is a section perspective view of an embodiment of the present invention.
Figure 7:
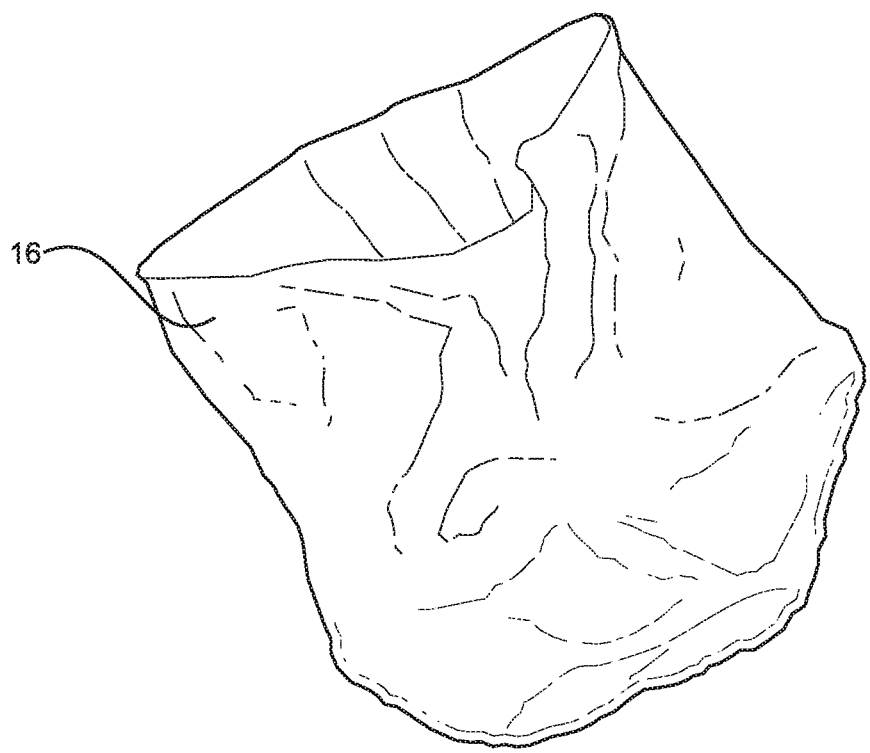
FIG. 7 is a perspective view of a disposable bag of an embodiment of the present invention.

Referring to FIGS. 1 through 7, the present invention includes a waste catching device. The waste catching device includes an elongated rod 18 having a first end and a second end. A handle 17 is coupled to the first end the elongated rod 18. The handle 17 includes a lever 15. A head 20 is coupled to the second end of the elongated rod 18. The head 20 includes a claw 19 having a first pivoting arm and a second pivoting arm. A spring 14 biases distal ends of the first pivoting arm and the second pivoting arm together. Bands 12 couple the lever 15 to proximal ends of the first pivoting arm and the second pivoting arm. The claw 19 includes an open position and a closed position. The open position includes the lever 15 actuated to pull the first pivoting arm and the second pivoting arm away from one another, and a closed position includes the lever 15 released.

The present invention may further includes a support 10. The support 10 includes a U-shape having a first arm and a second arm extending from opposing sides of a base. The support 10 has an upper surface and a lower surface. The proximal ends of the first pivoting arm and the second pivoting arm are pivotably coupled to the upper surface of the base. For example, the base of the support 10 may include a pair of pivot pins 11 disposed within openings the first pivoting arm and the second pivoting arm. A top plate 13 may couple the claws 19 to the base 10. The top plate 13 may include openings. The claw 19 is sandwiched in between the top plate 13 and the support 10 and the pair of pivot pins 11 are coupled within the openings of the top plate 13.

A method of catching waste may include the following. Providing the waste catching device disclosed above. Attach an entrance of a bag 16 to the claw 19. Press against the lever 15, thereby urging the first pivoting arm and the second pivoting arm away from one another so that the bag 16 opens. Place the bag 16 underneath an anus of a defecating animal. Release the lever 15 after feces has dropped in the bag 16, thereby closing the bag 16.

It should be understood, of course, that the foregoing relates to exemplary embodiments of the invention and that modifications may be made without departing from the spirit and scope of the invention as set forth in the following claims.

What is claimed is:

1. A waste catching device comprising:
   an elongated rod comprising a first end and a second end;
   a handle coupled to the first end of the elongated rod, the handle comprising a lever;
   a head coupled to the second end, wherein the head comprises:
     a claw comprising a first pivoting arm and a second pivoting arm; and
     a spring biasing distal ends of the first pivoting arm and the second pivoting arm together; and
   bands coupling the lever to proximal ends of the first pivoting arm and the second pivoting arm, wherein the claw comprises an open position and a closed position, wherein the open position comprises the lever actuated to pull the first pivoting arm and the second pivoting arm away from one another, and a closed position comprises the lever released.

2. The waste catching device of claim 1, further comprising a support comprising a U-shape having a first arm and a second arm extending from opposing sides of a base, the support having an upper surface and a lower surface, wherein the proximal ends of the first pivoting arm and the second pivoting arm are pivotably coupled to the upper surface of the base.

3. The waste catching device of claim 2, wherein the base of the support comprises a pair of pivot pins disposed within openings the first pivoting arm and the second pivoting arm.

4. The waste catching device of claim 3, further comprising a top plate comprising openings, wherein the claw is sandwiched in between the top plate and the support and the pair of pivot pins are coupled within the openings of the top plate.

5. A method of catching waste comprising steps of:
   providing a waste catching device comprising:
     an elongated rod comprising a first end and a second end;
     a handle coupled to the first end of the elongated rod, the handle comprising a lever;
     a head coupled to the second end, wherein the head comprises:
       a claw comprising a first pivoting arm and a second pivoting arm; and
       a spring biasing distal ends of the first pivoting arm and the second pivoting arm together; and
     bands coupling the lever to proximal ends of the first pivoting arm and the second pivoting arm;
   attaching an opening of a bag to the claw;
   pressing against the lever, thereby urging the first pivoting arm and the second pivoting arm away from one another so that the bag opens;
   placing the bag underneath an anus of a defecating animal; and
   releasing the lever after feces has dropped in the bag, thereby closing the bag.

6. The method of claim 5, wherein the waste catching device further comprises a support comprising a U-shape having a first arm and a second arm extending from opposing sides of a base, the support having an upper surface and a lower surface, wherein the first pivoting arm and the second pivoting arm each comprise a proximal end coupled to the upper surface of the base.

7. The method of claim 6, wherein the base of the support comprises a pair of pivot pins disposed within openings the first pivoting arm and the second pivoting arm.

8. The method of claim 7, wherein the waste catching device further comprises a top plate comprising openings, wherein the claw is sandwiched in between the top plate and the support and the pair of pivot pins are coupled within the openings of the top plate.

\* \* \* \* \*